(12) United States Patent
Alexiou et al.

(10) Patent No.: US 7,197,082 B2
(45) Date of Patent: Mar. 27, 2007

(54) LINEAR TRANSFORMATION OF SYMBOLS TO AT LEAST PARTIALLY COMPENSATE FOR CORRELATION BETWEEN ANTENNAS IN SPACE TIME BLOCK CODED SYSTEMS

(75) Inventors: Angeliki Alexiou, Swindon (GB); Mohammed Qaddi, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 741 days.

(21) Appl. No.: 10/392,935

(22) Filed: Mar. 20, 2003

(65) Prior Publication Data

US 2004/0185909 A1   Sep. 23, 2004

(51) Int. Cl.
*H04L 27/28* (2006.01)

(52) U.S. Cl. .................................... 375/260

(58) Field of Classification Search ................ 375/260, 375/259, 267, 295, 316, 377, 261, 263, 265
See application file for complete search history.

(56) References Cited

U.S. PATENT DOCUMENTS

| | | | | |
|---|---|---|---|---|
| 5,262,785 A * | 11/1993 | Silverstein et al. | ......... | 342/162 |
| 5,359,333 A * | 10/1994 | Withers, Jr. | ................. | 342/378 |
| 6,044,083 A * | 3/2000 | Citta et al. | ................... | 370/441 |
| 6,070,079 A * | 5/2000 | Kuwahara | ................ | 455/456.2 |
| 6,185,258 B1 | 2/2001 | Alamouti et al. | ........... | 375/260 |
| 6,891,897 B1 * | 5/2005 | Bevan et al. | ............... | 375/265 |
| 6,907,270 B1 | 6/2005 | Blanz | ...................... | 455/562.1 |
| 2001/0033622 A1 | 10/2001 | Jongren et al. | ............ | 375/267 |
| 2002/0136327 A1 | 9/2002 | El-Gamal et al. | ........... | 375/308 |
| 2003/0026349 A1 | 2/2003 | Onggosanusi et al. | ...... | 375/267 |
| 2003/0048857 A1 | 3/2003 | Onggosanusi et al. | ...... | 375/267 |
| 2003/0063654 A1 | 4/2003 | Onggosanusi et al. | ...... | 375/130 |
| 2003/0073464 A1 | 4/2003 | Giannakis et al. | .......... | 455/562 |
| 2003/0161412 A1 | 8/2003 | Niida et al. | ................. | 375/299 |
| 2003/0210750 A1 | 11/2003 | Onggosanusi et al. | ...... | 375/295 |
| 2004/0002364 A1 | 1/2004 | Trikkonen et al. | ....... | 455/562.1 |

OTHER PUBLICATIONS

Christopher Brunner, et al, "Downlink Eigenbeamforming in WCDMA", *European Wireless 2000*, Dresden, Germany, (Sep. 2000).
Helmut Bolcskei, et al, Performance of Space-Time Codes in the Presence of Spatial Fading Correlation, *34th Asilomar Conf. On Signals, Systems and Comuputers*, vol. 1, (2000), pp. 687-693.
Angeliki Alexiou, "Realistic Channel Model Considerations in UMTS Downlink Capacity with Space-Time Block Coding", *Third IEEE Signal Processing Workshop on Signal Processing Advances in Wireless Communications*, Taoyuan, Taiwan, (Mar. 2001), pp. 275-278.

(Continued)

*Primary Examiner*—Pankaj Kumar

(57) ABSTRACT

A method is provided of transmitting signals from two or more antennas in a wireless telecommunications network, in which at least one data sequence is space-time block encoded. Before transmitting the data sequence, a linear transformation is applied to the data sequence, the linear transformation being adapted to use knowledge of correlation among the antennas to at least partially compensate the transmitted signals for said correlation. The linear transformation depends on the eigenvalues of an antenna correlation matrix. The linear transformation further depends on a ratio of symbol energy ($E_s$) to noise variance ($\sigma^2$). The method includes transmitting the encoded and transformed data sequence.

21 Claims, 2 Drawing Sheets

OTHER PUBLICATIONS

Jack Salz, et al, "Effect of Fading Correlation on Adaptive Arrays in Digital Mobile Radio", *IEEE Transactions on Vehicular Technology*, vol. 43, No. 4, (Nov. 1994), pp. 1049-1057.

Da-Shan Shiu, et al, "Fading Correlation and Its Effect on the Capacity of Multielement Antenna Systems", *IEEE Transactions on Communications*, vol. 48, No. 3, (Mar. 2000), pp. 502-513.

Siavash M. Alamouti, A Simple Transmit Diversity Technique for Wireless Communications, *IEEE Journal on Select Areas in Communications*, vol. 16, No. 8, (Oct. 1998), pp. 1451-1458.

Hemanth Sampath, et al, "Linear Precoding for Space-Time Coded Systems With Known Fading Correlations", *IEEE Communications Letters*, vol. 6, No. 6, (Jun. 2002), pp. 239-241.

* cited by examiner

LINEAR TRANSFORMATION OF SYMBOLS TO AT LEAST PARTIALLY COMPENSATE FOR CORRELATION BETWEEN ANTENNAS IN SPACE TIME BLOCK CODED SYSTEMS

FIELD OF THE INVENTION

The present invention relates to methods of multiple antenna wireless transmission using space-time block encoding.

DESCRIPTION OF THE RELATED ART

Base station antennas are often placed high above ground and relatively close to each other. There may be no obstructions between them acting to scatter transmitted symbols, leading to high antenna correlation. It has been shown that such correlations reduce channel capacity and system performance in multiple-input multiple-output (MIMO) systems.

Specifically as regards Universal Mobile Telecommunications System (UMTS) networks, performance degradation due to antenna correlation is prevented merely by increasing the spacing of antennas. However, it has been found that in situations where the angular spread of radio waves reaching an antenna is relatively small or where there are no line of sight obstructions between antennas, antenna correlation is high (i.e. taking a value close to one) even when the antennas are well-separated.

Accordingly, those skilled in the art have recognised that antenna correlations tend to degrade the performance of MIMO systems.

SUMMARY OF THE INVENTION

A linear transformation (e.g., precoder) is provided for a space-time coded system, which alters transmitted signals to at least partially compensate for antenna correlation. The linear precoder combats the detrimental effects of antenna correlation by exploiting knowledge of antenna correlation made available to the transmitter.

An example of the present invention is a method of transmitting signals from two or more antennas in a wireless telecommunications network, in which at least one data sequence is space-time block encoded. Before transmitting the data sequence, a linear transformation is applied to the data sequence, the linear transformation being adapted to use knowledge of correlation among the antennas to at least partially compensate the transmitted signals for said correlation. The linear transformation depends on the eigenvalues of an antenna correlation matrix. The linear transformation further depends on a ratio of symbol energy ($E_s$) to noise variance ($\sigma^2$). The method includes transmitting the encoded and transformed data sequence.

BRIEF DESCRIPTION OF THE DRAWINGS

The present invention will be better understood from reading the following description of non-limiting embodiments, with reference to the attached drawings, wherein below.

Figure 1:
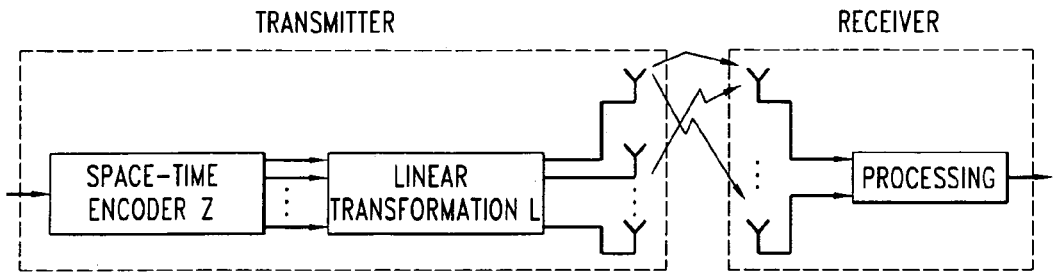
FIG. 1 is a diagram illustrating a MIMO telecommunications network

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

For ease of understanding a more general description is presented, followed by an explanation of implementation aspects in a mobile telecommunications network of Universal Mobile Telecommunications System (UMTS) type. It should be noted that the present invention has applications not only in UMTS, but also, by way of example and without limitation, in communication systems such as code division multiple access (CDMA) and wideband code division multiple access (W-CDMA).

MIMO systems, for example for use in UMTS, typically involve space-time block encoding. An example of space-time block encoding scheme for two transmit antennas is presented in S. M. Alamouti, "A Simple Transmit Diversity Technique for Wireless Communications", IEEE Journal on Selected Areas in Communication, Vol. 16, No. 8, pp. 1451–1458, October 1998 and is also described in U.S. Pat. No. 6,185,258, which is incorporated herein by reference. The encoding and transmission sequence for this scheme is as follows: at a first transmission time instant $t_1$ symbols $x_1$ and $x_2$ are transmitted from antennas 1 and 2 respectively and at the next transmission instant $t_2$ symbols $-x_2^*$ and $x_1^*$ are transmitted from antennas 1 and 2 respectively, where * denotes complex conjugate. This transmission sequence Z can be represented in matrix form as $$\begin{bmatrix} x_1 & x_2 \\ -x_2^* & x_1^* \end{bmatrix}.$$

As further background, it is known that the performance of MIMO systems can sometimes be improved by precoding. Precoding means applying a linear transformation to symbols. A so-called optimal linear precoder for space-time coded systems that assumes knowledge of, and compensates for, the transmit antenna correlations was proposed in H. Sampath, A. Paulraj, "A Linear precoding for space-time coded systems with known fading correlations" IEEE Communications Letters, Volume: 6 Issue: 6, June 2002, Page(s): 239–241. This precoder is a function of both the matrices of eigenvectors and eigenvalues of the antenna correlation matrix R. Specifically, the optimal precoder L, which is optimal in the sense that the average Pairwise Error Probability (PEP) between two codewords is minimised, is proved to be:

$$L = V_r \Phi_f V_e^H \qquad (1)$$

where $R^{1/2} = U_r \Lambda_r V_r$, with $U_r$ and $V_r$ being the matrices of eigenvectors of the matrix $R^{1/2}$ and $\Lambda_r$ being the matrix of eigenvalues of $R^{1/2}$. R is the antenna correlation matrix. $\Phi_f^2 = (\gamma I - \Lambda_r^{-2} \Lambda_e^{-2})_+$, with I being the identity matrix, and $EE^H = U_e \Lambda_e V_e$, E being the matrix of the minimum distance of the code, with $U_e$ and $V_e$ being the matrices of eigenvectors of $EE^H$ and $\Lambda_e$ being the matrix of eigenvalues of $EE^H$. $\gamma > 0$ is a constant that is computed from the transmit power and $(\cdot)+$ denotes that the expression in the parenthesis takes its actual computed value if positive else is set to zero if negative.

A linear precoder that exploits knowledge of antenna correlation is included in a space-time coded MIMO system so as to enhance performance. Let us consider a multiple-input multiple output (MIMO) telecommunications network consisting of M transmit antennas and N receive antennas, as shown in FIG. 1. The transmitter, for example a base station for mobile telecommunications, has some knowledge about the channel, namely the antenna correlation matrix R. There is a channel matrix H which describes the physical characteristics of the propagation channel. More specifically, each entry $h_{ji}$ of the N×M channel matrix H represents the channel response between transmit antenna i and receive antenna j. The space-time encoder of the transmitter maps the input data sequence $x=(x_1,x_2,\ldots x_Q)$ to be transmitted into an M×Q matrix Z of codewords, that are split on a set of M parallel sequences. I.e., each of the M rows of the matrix Z represents one of Q distinct codewords. These codewords are then transformed by a M×M linear transformation denoted L in order to adapt the code to the available antenna correlation information. The resulting sequences, which are represented by rows of a new transformed M×Q matrix C=LZ, are sent from the M transmit antennas over Q time intervals.

The receive signal (at the mobile) is assumed to be a linear combination of several multipaths reflected from local scatterers, which result in uncorrelated fading across the receive antennas and therefore uncorrelated rows of matrix H. However, limited scattering at the transmitter (e.g. a base station), can result in antenna correlation and hence correlated columns of channel matrix H. A correlation among the M transmit antennas is described by the M×M matrix R, referred to as the (transmit) antenna correlation matrix. The signal received by the N receive antennas over Q time periods is represented by an N×Q matrix Y. The received signal included in the matrix Y is then a superposition of M transmitted sequences corrupted by an additive white Gaussian noise characterised by the N×Q matrix Σ and with covariance matrix equal to $\sigma^2 I_N$:

$$Y=HC+\Sigma=HLZ+\Sigma \quad (2)$$

The linear transformation L is determined so as to minimise a given criterion, namely an upper bound on the pairwise error probability (PEP) of a codeword. The determination of L, as described here, assumes for mathematical simplification that the transmitter possesses perfect knowledge of the antenna correlation matrix. This precoder L is a function of both the matrices of eigenvectors and eigenvalues of the antenna correlation matrix. Specifically, the optimal precoder L, which minimises the average PEP is:

$$L=V_r\Phi_f V_e^H \quad (3)$$

where $R^{1/2}=U_r\Lambda_r V_r$, with $U_r$ and $V_r$ being the matrices of eigenvectors of the correlation matrix $R^{1/2}$ and $\Lambda_r$ being the matrix of eigenvalues of $R^{1/2}$. R is the antenna correlation matrix.

$$\Phi_f^2 = \left(\gamma I - \left(\frac{E_S}{\sigma^2}\right)^{-1} \Lambda_r^{-2} \Lambda_e^{-2}\right)_+,$$

with I being the identity matrix and $EE^H = U_e \Lambda_e V_e$, where E is the matrix of the minimum distance of the code, with $U_e$ and $V_e$ being the matrices of eigenvectors of $EE^H$ and $\Lambda_e$ the matrix of eigenvalues of $EE^H$. Also, γ>0 is a constant that is computed from the transmit power $P_O$ and (·)+ denotes that the expression in the parenthesis takes it actual computed values if positive else is set to zero if negative. It will be seen that there is an additional term $$\left(\frac{E_S}{\sigma^2}\right)^{-1},$$

where $E_s$ is the symbol energy and $\sigma^2$ is the noise variance. This term was included so as to account for Signal-to-Noise Ratio, which is $E_s/\sigma^2$.

Since an orthogonal space-time code is considered, $EE^H=\zeta I$, where ζ is a scalar, $\Lambda_e=\zeta I$ and $V_e=I$. This gives:

$$L=V_r\Phi_f \quad (4)$$

Application to a Two-antenna Transmission System

The next step is to apply both the linear precoder L of Equation (4) and the matrix of codewords for Alamouti space-time block coding, namely $$Z = \begin{bmatrix} x_1 & x_2 \\ -x_2^* & x_1^* \end{bmatrix}$$

to Equation (2).

For power $P_o=1$, where $\lambda_{r,1},\lambda_{r,2}$ are the eigenvalues and $[w_1, w_2]$ is the strongest eigenvector of the matrix $R^{1/2}$, the linear precoder is characterised as follows:

1) When the antenna correlation is less than one, $\lambda_{r,1},\lambda_{r,2}\neq 0$ and $$\beta = \left(\frac{1}{\lambda_{r,2}^2} - \frac{1}{\lambda_{r,1}^2}\right) \Big/ \left(\frac{E_S}{\sigma^2}\right) \leq 1,$$

the precoder can be written as:

$$L = \begin{bmatrix} w_1 & w_2^* \\ w_2 & -w_1^* \end{bmatrix} \begin{bmatrix} \sqrt{(1+\beta)/2} & 0 \\ 0 & \sqrt{(1-\beta)/2} \end{bmatrix} \quad (3)$$

with $V_r = \begin{bmatrix} w_1 & w_2^* \\ w_2 & -w_1^* \end{bmatrix}$ and $\Phi_f = \begin{bmatrix} \sqrt{(1+\beta)/2} & 0 \\ 0 & \sqrt{(1-\beta)/2} \end{bmatrix}$ 2) When the antenna correlation is zero, the eigenvalues of the matrix $R^{1/2}$ are equal and therefore β=0. In this case the precoder becomes $$L = \frac{1}{\sqrt{2}} \begin{bmatrix} w_1 & w_2^* \\ w_2 & -w_1^* \end{bmatrix}$$

which is equivalent to the Alamouti orthogonal space-time coding.

3) When the antenna correlation is one, one eigenvalue of matrix $R^{1/2}$ is zero resulting in a matrix $\Phi_f$ with all elements but one equal to zero. In this case the precoder becomes $$L = \begin{bmatrix} w_1 & 0 \\ w_2 & 0 \end{bmatrix},$$

which is equivalent to a beamformer.

The proposed reconfigurable scheme is thus equivalent to orthogonal space-time block coding for antenna correlation equal to zero, and to beamforming for antenna correlation equal to one. For intermediate antenna correlation values it performs well and is robust to antenna correlation variations.

The Decoder

The space-time decoder at the receiver is similar to the one used with Space-Time Block Codes (and described in the Alamouti paper referred to above), except that the linear transformation matrix L is taken into account. The received signal described in Equation (2) can be seen as $Y=[y_1 \ y_2]=H_{eq}Z+\Sigma=HLZ+\Sigma$, where $H_{eq}=[h_{eq,1} \ h_{eq,2}]=HL$. The space-time block decoder for the proposed approach can then be seen as identical with the conventional one under the assumption that the effective channel is now $H_{eq}$. Hence, to recover the transmitted signals $x_1$ and $x_2$, the following operations are realised:

$$\hat{x}_1=(h_{eq,1})^*y_1-h_{eq,2}(y_2)^*$$

$$\hat{x}_2=(h_{eq,2})^*y_1+h_{eq,1}(y_2)^*$$

It will be seen that knowledge of the equivalent channel $H_{eq}$ (or its estimate) is required at the receiver in order to recover the transmitted signals $x_1$ and $x_2$.

UMTS System Implementation

Figure 2:
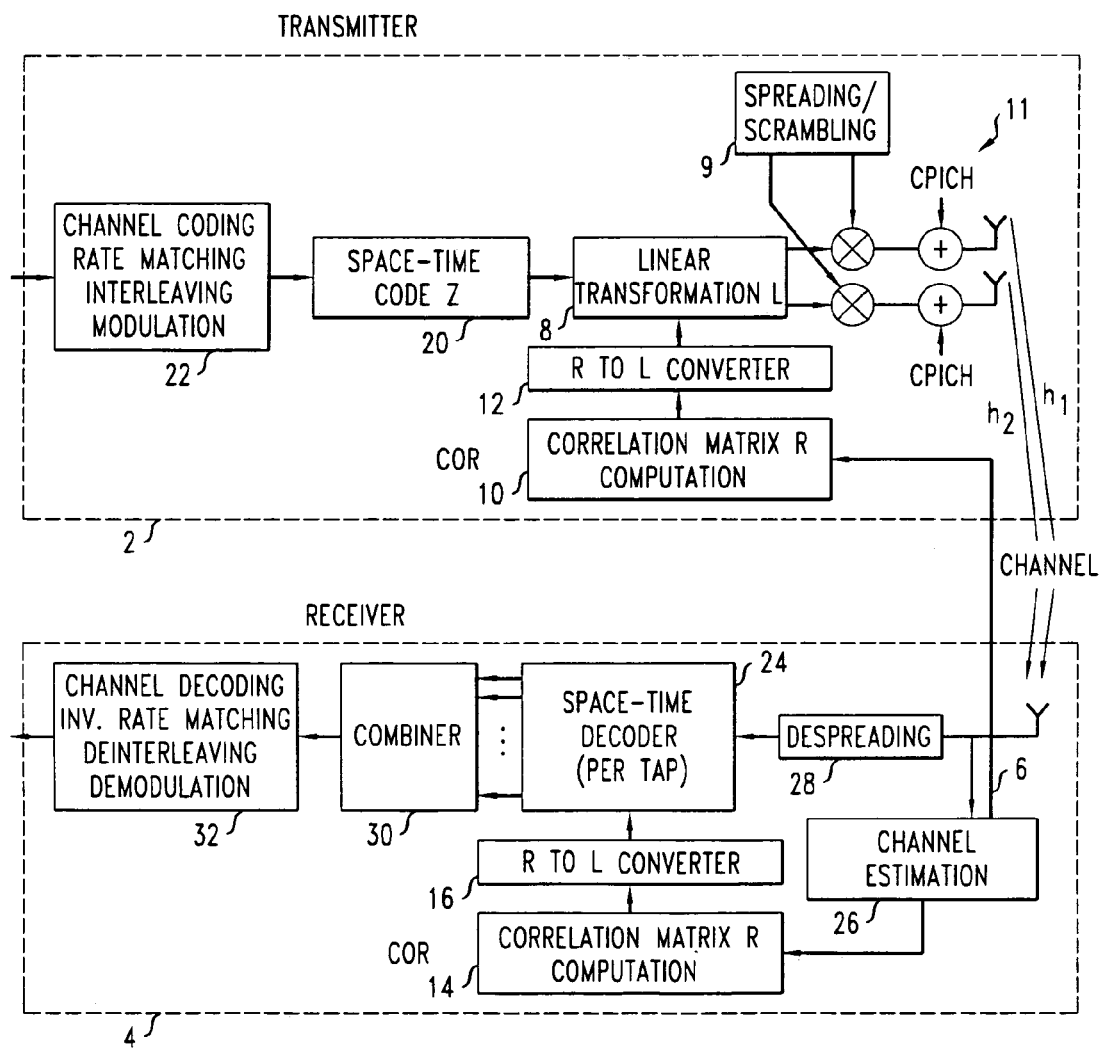
FIG. 2 is a diagram illustrating a UMTS transmitter and receiver.

A UMTS transmitter 2 and receiver 4 are shown in FIG. 2. The UMTS frequency division duplex (FDD) downlink transmission-reception scheme includes antenna correlation dependent linear precoding as explained above. The transmitter 2 has some knowledge about the channel, namely the antenna correlation matrix R. In a UMTS network operating FDD downlink (e.g., from base station to mobile station), the antenna correlation information is obtained as feedback channel estimates 6 provided as bits sent by receiver 4 (i.e. the mobile station). The relevant modules are, at the transmitter, a linear precoder (L) 8, a processor (COR,10) which determines the antenna correlation matrix (R), and an R to L converter 12. The relevant modules at the receiver are a processor (COR,14) which determines the antenna correlation matrix (R), an R to L converter 16, and a space-time decoder 18.

At the transmitter 2, the linear precoder (L) 8 is applied to the space-time encoded symbols provided from a space-time block encoder 20 after channel coding, rate matching interleaving, and modulation (shown as functional clock 22) in known fashion. The linear precoder L coefficients are computed based on the antenna correlation matrix R in the R to L converter 12. The computation of R (in a functional block denoted COR,10) is based on channel estimates 6 fed back from the receiver 4. It is performed by averaging over time-sequential channel estimates (running average) using a forgetting factor. The forgetting factor aims to weight the contribution of each new channel estimate as compared to the past channel estimates. It will thus be seen that fast fading is not tracked but only slowly varying antenna correlations. This information is fed back to the transmitter using a low-rate feedback link, as available in UMTS. In a UMTS uplink channel there is a number of bits available for communicating information to the transmitter about the received signal. The outputs of the linear precoder 8 are spread/scrambled 9 and subject to addition of Common Pilot Channel (CPICH) coding 11 bits before transmission.

At the receiver 4, received signals are used to provide channel estimates in a channel estimation block 26 so as to be used to compute the antenna correlation matrix R in processor 14 (as at the transmitter). The signals are also despread 28 and applied to a space-time block decoder 24. At the receiver 4 the space-time block decoder (STD,24) has essentially the same structure as a conventional one (described in the Alamouti paper and patent referred to above), but needs to consider instead of the channel estimates, the equivalent channel, defined as the linear transformation of the channel according to the coefficients of L, that is $H_{eq}=[h_{eq,1} \ h_{eq,2}]=HL$. As shown in FIG. 2, the linear precoder L coefficients are estimated at the receiver from the processor (COR,14) which determines the antenna correlation matrix (R) and the R to L converter 16 present at the receiver 4. The outputs of the space-time decoder 24 are provided to a combiner 30 and then channel decoded, inverse rate matched, deinterleaved and demodulated in known fashion (shown in FIG. 2 as functional block 32).

Alternative UMTS Implementation

An alternative implementation is now described, in which instead of the linear transformation matrix L being determined at the transmitter from channel estimates provided by the receiver, the coefficients of linear transformation matrix L are provided by the receiver.

Figure 3:
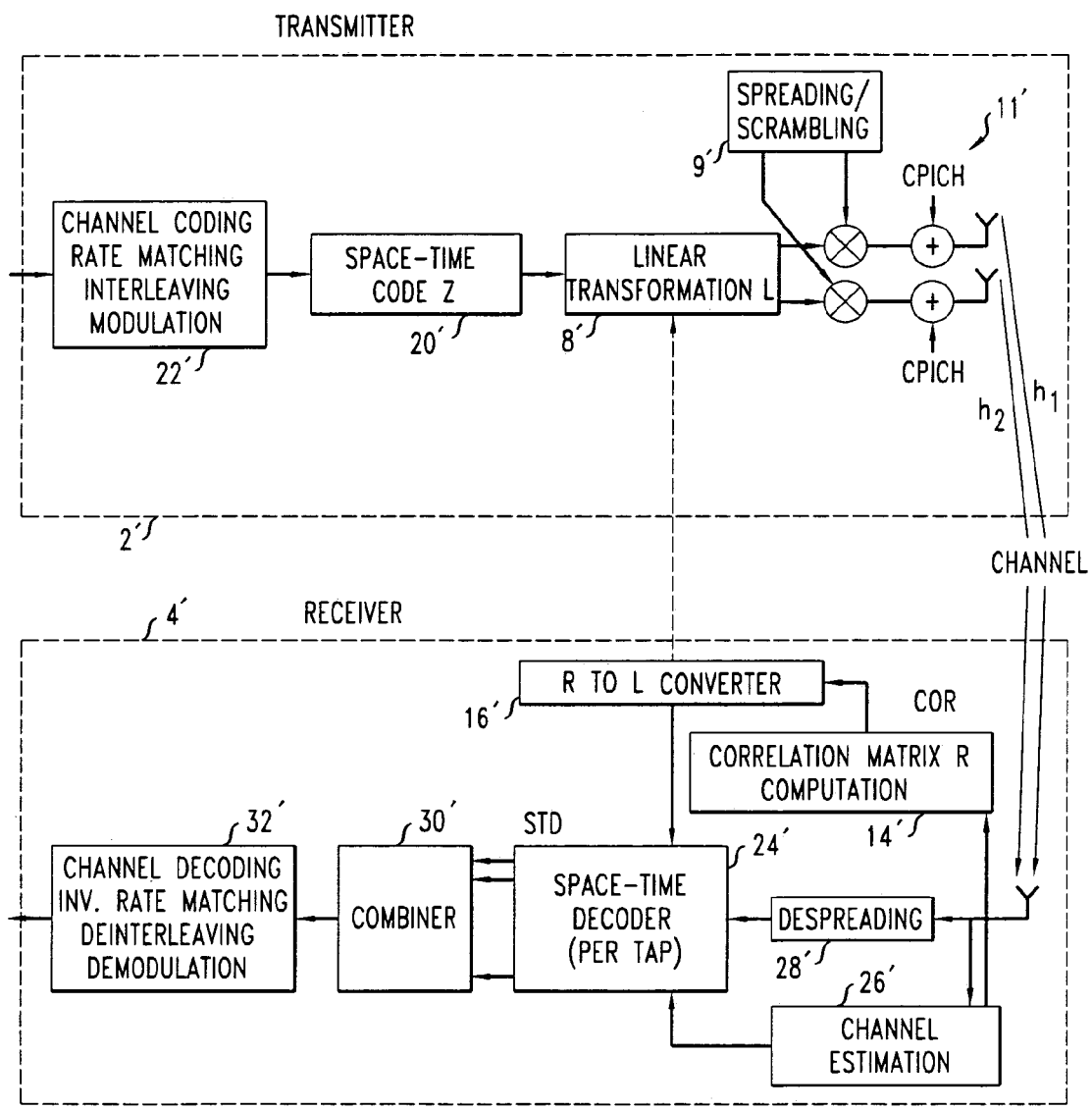
FIG. 3 is a diagram illustrating an alternative UMTS transmitter and receiver.

In this alternative embodiment, which is shown in FIG. 3, the transmitter 2' is given the coefficients of the precoder L by the receiver 4'. In this UMTS transmitter 2' and receiver 4' operating with frequency division duplex (FDD) downlink, these coefficients are feedback bits sent by the mobile station. The proposed UMTS network is depicted in FIG. 3, where the UMTS FDD downlink transmission-reception scheme includes antenna correlation dependent linear precoding as explained previously. The relevant module at the transmitter is a linear precoder (L) 8'. The relevant modules at the receiver are a processor (COR,14') which determines the antenna correlation matrix (R), an R to L converter 16', and a space-time decoder 24'.

At the transmitter, the linear precoder (L) is applied to the space-time encoded symbols provided from the space-time block encoder 20' after channel coding, rate matching, interleaving, and modulation (shown as functional block 22') in known fashion. The outputs from the linear precoder 8' are spread/scrambled 9' and subject to the addition of Common Pilot Channel (CPICH) 11' bits before transmission. The linear precoder L coefficients are provided by the receiver 4' as explained below and fed back over air to the transmitter.

At the receiver, the computation of R (in a functional block denoted COR 14') is based on channel estimates provided from the channel estimator lock 26'. It is performed by averaging over time sequential channel estimates (running average) using a forgetting factor. The forgetting factor aims to weight the contribution of each new channel estimate as compared to the past channel estimates; the aim being to take account of slowly-varying antenna correlations but not fast fading. The linear precoder (L) coefficients are computed based on the antenna correlation matrix R in the R to L converter 16'.

At the receiver 4', received signals are both used to provide channel estimates in a channel estimation block 26', and are also despread 28' and applied to a space-time decoder 24'. At the receiver, the space-time block decoder (STD) 24' has identical structure to the conventional one (described in the Alamouti paper and patent referred to above), but needs to consider instead of the channel estimates, the equivalent channel, defined as the linear transformation of the channel according to the coefficients of L, that is $H_{eq}=[h_{eq,1}\ h_{eq,2}]=HL$. The outputs of the space-time decoder are provided to a combiner 30' and then channel decoded, inverse rate matched, deinterleaved and demodulated in known fashion (shown in FIG. 3 as functional block 32').

General

It is believed that this approach has natural extensions to the cases in which there are three or more transmit antennas. Extensions to such cases are also considered to lie within the scope of the present invention.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as network elements, the wireless unit, the base station, a base station controller, a mobile switching center and/or a radar system. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of transmitting signals from a transmitter comprising two antennas in a wireless telecommunications network, comprising:

space-time block encoding at least one data sequence;

before transmitting the data sequence, applying to the data sequence a linear transformation dependent upon knowledge of correlation among the antennas so as to at least partially compensate the transmitted signals for said correlation, wherein said correlation is characterized in an antenna correlation matrix having eigenvalues $\gamma_{r,1}, \gamma_{r,2}$ and eigenvectors $w_1, w_2$, and the linear transformation depends on the said eigenvalues, on said eigenvectors, and on a ratio of symbol energy ($E_s$) to noise variance ($\sigma^2$); and transmitting the encoded and transformed data sequence;

wherein:

the method further comprises calculating a value of a parameter β related to the $$\left(\frac{1}{\lambda_{r,2}^2} - \frac{1}{\lambda_{r,1}^2}\right) \bigg/ \left(\frac{E_s}{\sigma^2}\right);$$

and the linear transformation is determined from β and from the eigenvectors $w_1, w_2$ of the antenna correlation matrix.

2. The method of claim 1, wherein the linear transformation is applied prior to block encoding the data sequence.

3. The method of claim 1, wherein the linear transformation is applied after block encoding the data sequence.

4. The method of claim 1, in which the linear transformation is determined as $$L = \begin{bmatrix} w_1 & w_2^* \\ w_2 & -w_1^* \end{bmatrix} \begin{bmatrix} \sqrt{(1+\beta)/2} & 0 \\ 0 & \sqrt{(1-\beta)/2} \end{bmatrix}.$$

5. A method according to claim 1, in which the space-time block encoding is such that at a first transmission time instant ($t_1$) a first symbol ($x_1$) is transmitted from a first of the two antennas and a second symbol ($x_2$) is transmitted from the second of the two antennas, then at a next transmission instant ($t_2$) a negative complex conjugate of the second symbol ($-x_2^*$) is transmitted from the first antenna and a complex conjugate ($x_1^*$) of the first symbol is transmitted from the second antenna.

6. A method according to claim 1, in which the space-time block encoding is Alamouti space-time block encoding.

7. A transmitter for wireless telecommunications comprising a space time block encoder, and a linear transformation apparatus operative to transform the data sequence from or to a space-time block encoder so as to at least partially compensate for correlation between antennas, and the transmitter comprising two antennas operative to transmit the encoded and transformed data sequence, the linear transformation apparatus comprising:

a first processor operative to determine an antenna correlation matrix (R), and a second processor operative to:

determine two eigenvalues ($\lambda_{r,1}, \lambda_{r,2}$) and two eigenvectors $w_1, w_2$ of the antenna correlation matrix (R), determine a ratio $E_s/\sigma^2$ of symbol energy ($E_s$) to noise variance ($\sigma^2$), determine a linear transformation matrix (L) to be applied dependent upon the eigenvalues and on said ratio of symbol energy to noise variance;

wherein:

the second processor is operative to:

calculate a value of a parameter β where $$\beta = \left(\frac{1}{\lambda_{r,2}^2} - \frac{1}{\lambda_{r,1}^2}\right) \bigg/ \left(\frac{E_s}{\sigma^2}\right),$$

and determine a linear transformation matrix (L) to be applied to the symbols from the value of β and the eigenvectors $w_1, w_2$).

8. The transmitter of claim 7, wherein the linear transformation apparatus applies the linear transformation before the data sequence is block encoded.

9. The transmitter of claim 7, wherein the linear transformation apparatus applies the linear transformation after the data sequence is block encoded.

10. The transmitter of claim 7, wherein the linear transformation further depends on the eigenvectors of the antenna correlation matrix.

11. A transmitter according to claim 7, in which the space-time block encoder operates such that at a first transmission time instant ($t_1$) a first symbol ($x_1$) is transmitted from a first of the two antennas and a second symbol ($x_2$) is transmitted from the second of the two antennas, then at a next transmission instant ($t_2$) a negative complex conjugate of the second symbol ($-x_2^*$) is transmitted from the first antenna and a complex conjugate ($x_1^*$) of the first symbol is transmitted from the second antenna.

12. A transmitter according to claim 11, in which the space-time block encoder is an Alamouti space-time block encoder.

13. A transmitter according to claim 7, which is a base station operating according to a code division multiple access (CDMA) or wideband code division multiple access (W-CDMA) transmission scheme.

14. A transmitter according to claim 13, in which the base station operates in accordance with the Universal Mobile Telecommunications System (UMTS) standard.

15. A transmitter according to claim 7, in which the first processor operative to determine the antenna correlation matrix (R) makes the determination from channel estimates.

16. A receiver for mobile telecommunications comprising a space-time block decoder and a channel estimator, an antenna correlation matrix (R) being determined from the received channel estimates provided by the channel estimator, the space-time block decoder comprising a processor operative to determine the antenna correlation matrix (R), and a processor operative to:
  determine two eigenvalues ($\lambda_{r,1}, \lambda_{r,2}$) and two eigenvectors ($W_1, W_2$) of the antenna correlation matrix (R),
  determine a ratio $E_s/\sigma^2$ of symbol enemy ($E_s$) to noise variance ($\sigma^2$), and determine a linear transformation matrix (L) to be applied to received symbols dependent upon the eigenvalues and on said ratio of symbol energy to noise variance, by
  calculating a value of a parameter $\beta$ where $$\beta = \left(\frac{1}{\lambda_{r,2}^2} - \frac{1}{\lambda_{r,1}^2}\right) / \left(\frac{E_S}{\sigma^2}\right),$$

and
  determining the linear transformation matrix (L) to be applied to the received symbols from the value of $\beta$ and the eigenvectors ($w_1, w_2$).

17. A receiver according to claim 16, which is a mobile user terminal operating in accordance with UMTS or another wideband-code division multiple access (W-CDMA) or code division multiple access (CDMA) standard.

18. A space-time block decoder comprising a first processor operative to determine an antenna correlation matrix (R), and a second processor operative to: determine two eigenvalues ($\lambda_{r,1}, \lambda_{r,2}$) and two eigenvectors ($w_1, w_2$) of the antenna correlation matrix (R), determine a ratio $E_s/\sigma^2$ of symbol energy ($E_s$) to noise variance ($\sigma^2$), and determine a linear transformation matrix (L) to be applied to received symbols dependent upon the eigenvalues and on said ratio of symbol energy to noise variance, by calculating a value of a parameter $\beta$ where $$\beta = \left(\frac{1}{\lambda_{r,2}^2} - \frac{1}{\lambda_{r,1}^2}\right) / \left(\frac{E_S}{\sigma^2}\right),$$

and determining the linear transformation matrix (L) to be applied to the symbols from the value of $\beta$ and the eigenvectors ($w_1, w_2$).

19. A space-time block decoder according to claim 18, in which an effective channel ($H_{eq}$) used in decoding is taken to be HL where H Is the channel matrix and L is the linear transformation matrix.

20. A linear transformation apparatus operative to transform symbols from or to a space-time block encoder so as to at least partially compensate for correlation between antennas of a transmitter comprising two antennas, comprising: a first processor operative to determine an antenna correlation matrix (R), and
  a second processor operative to:
    determine two eigenvalues ($\lambda_{r,1}, \lambda_{r,2}$) and two eigenvectors ($w_1, w_2$) of the antenna correlation matrix (R),
    determine a ratio $E_s/\sigma^2$ of symbol energy ($E_s$) to noise variance ($\sigma^2$), and
    determine a linear transformation matrix (L) to be applied dependent upon the eigenvalues and on the ratio of symbol energy to noise variance;
  wherein;
    the second processor is operative to:
    calculate a value of a parameter $\beta$ where $$\beta = \left(\frac{1}{\lambda_{r,2}^2} - \frac{1}{\lambda_{r,1}^2}\right) / \left(\frac{E_S}{\sigma^2}\right),$$

and
    determine a linear transformation matrix (L) to be applied to the symbols from the value of p and the eigenvectors ($w_1, w_2$).

21. A method of linear transformation of symbols from or to a space-time block encoder so as to at least partially compensate for correlation between antennas of a transmitter comprising two antennas, the method comprising the steps of:
  determining an antenna correlation matrix (R).
  determining two eigenvalues ($\lambda_{r,1}, \lambda_{r,2}$) and two eigenvectors ($w_1, w_2$) of the antenna correlation matrix (R)
  determining a ratio $E_s/\sigma^2$ of symbol energy ($E_s$) to noise variance ($\sigma^2$), and
  determining a linear transformation matrix (L) to be applied dependent upon the eigenvalues, on the eigenvectors, and on the ratio of symbol energy to noise variance,
  wherein:
    the method further comprises calculating a value of a parameter $\beta$ related to the quantity $$\left(\frac{1}{\lambda_{r,2}^2} - \frac{1}{\lambda_{r,1}^2}\right) / \left(\frac{E_S}{\sigma^2}\right);$$

and
    the linear transformation is determined from $\beta$ and from the eigenvectors ($w_1, w_2$) of the antenna correlation matrix.

* * * * *